(12) United States Patent
Travers et al.

(10) Patent No.: US 7,190,330 B2
(45) Date of Patent: Mar. 13, 2007

(54) VIRTUAL DISPLAY HEADSET

(75) Inventors: Paul J. Travers, Honeoye Falls, NY (US); Paul J. Churnetski, West Henrietta, NY (US); Stephen J. Glaser, Pittsford, NY (US); David Vogler, Rochester, NY (US); James Gresko, Rochester, NY (US)

(73) Assignee: Icuiti Corporation, Rochester, NY (US)

( * ) Notice: Subject to any disclaimer, the term of this patent is extended or adjusted under 35 U.S.C. 154(b) by 260 days.

(21) Appl. No.: 10/752,948

(22) Filed: Jan. 7, 2004

(65) Prior Publication Data

US 2005/0146488 A1    Jul. 7, 2005

(51) Int. Cl.
 *G09G 5/00* (2006.01)
(52) U.S. Cl. ............................................. 345/7; 345/8
(58) Field of Classification Search .................... 345/7, 345/8, 9, 53; 359/630, 13; 358/106, 213, 358/209, 633; 381/381; 83/726; 348/51, 348/52, 53, 742, 743
See application file for complete search history.

(56) References Cited

U.S. PATENT DOCUMENTS

| 4,484,029 | A | | 11/1984 | Kenney | |
|---|---|---|---|---|---|
| 5,504,812 | A | | 4/1996 | Vangarde | |
| 5,694,467 | A | | 12/1997 | Young, III | |
| 5,715,321 | A | | 2/1998 | Andrea et al. | |
| 6,016,347 | A | | 1/2000 | Magnasco et al. | |
| 6,034,653 | A | | 3/2000 | Robertson et al. | |
| 6,101,260 | A | * | 8/2000 | Jensen et al. | 381/381 |
| 6,683,584 | B2 | * | 1/2004 | Ronzani et al. | 345/8 |
| 2003/0015368 | A1 | * | 1/2003 | Cybulski et al. | 181/131 |

* cited by examiner

*Primary Examiner*—Bipin Shalwala
*Assistant Examiner*—Nitin Patel
(74) *Attorney, Agent, or Firm*—Stephen B. Salai, Esq.; Brian B. Shaw, Esq.; Harter, Secrest & Emery LLP

(57) ABSTRACT

A headset for operably disposing a virtual display and optional speaker on the head of a user. The headset, including a cantilevered arm coupled to the headset with a pivot, including a hemispherical dome with at least three points of contact with the display support cantilever arm, and thus the headset, also including a stabilizer further stabilizing the virtual display with respect to the user.

5 Claims, 3 Drawing Sheets

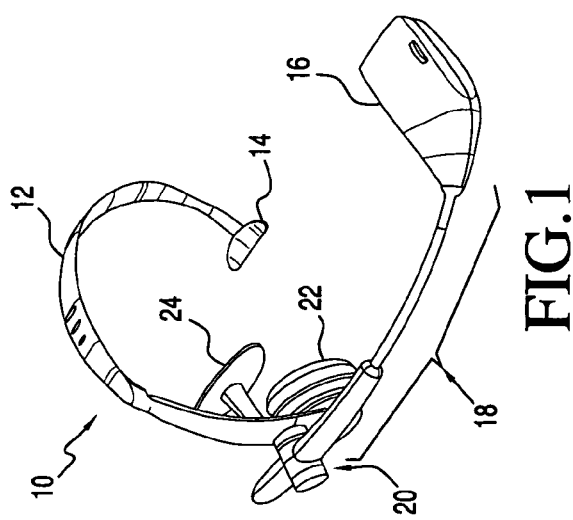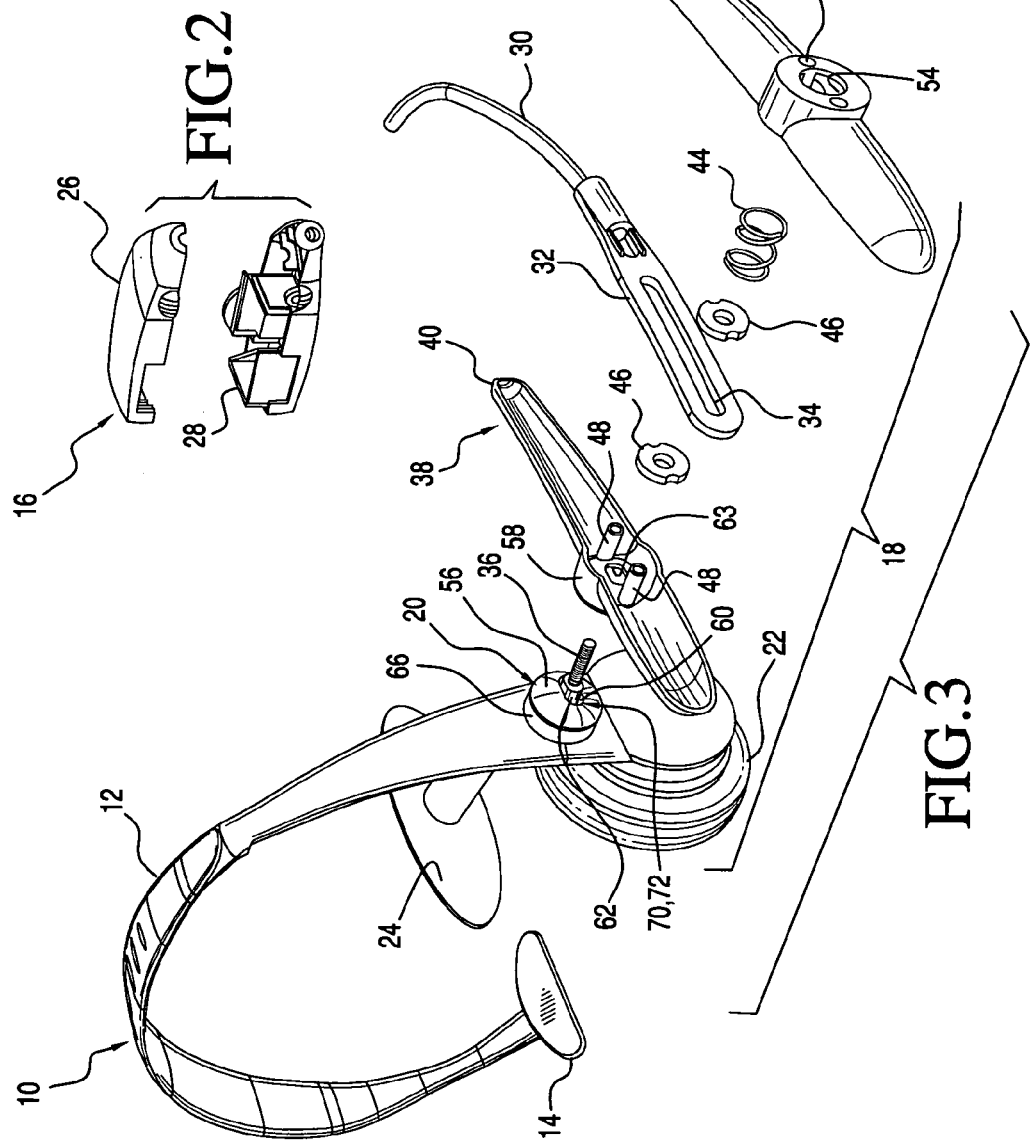

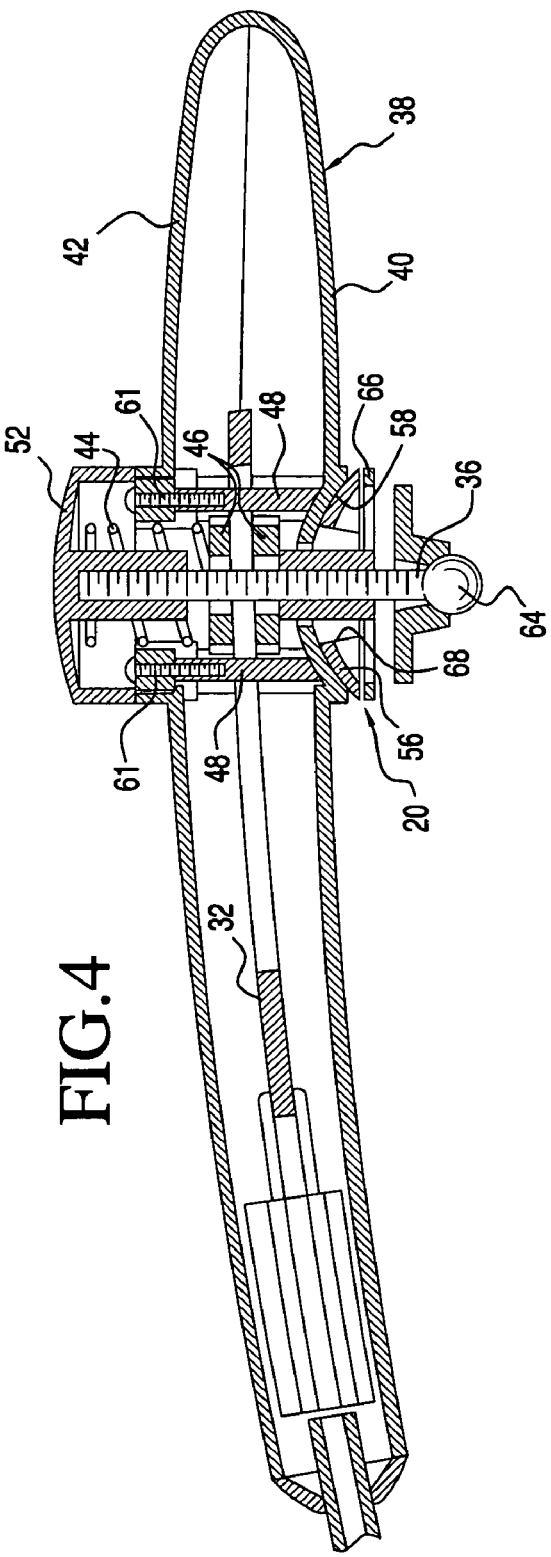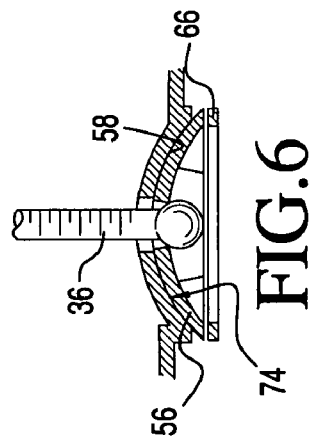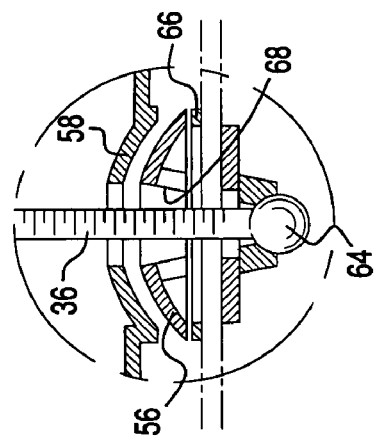

VIRTUAL DISPLAY HEADSET

BACKGROUND OF THE INVENTION

1. Field of the Invention

Figure 7:
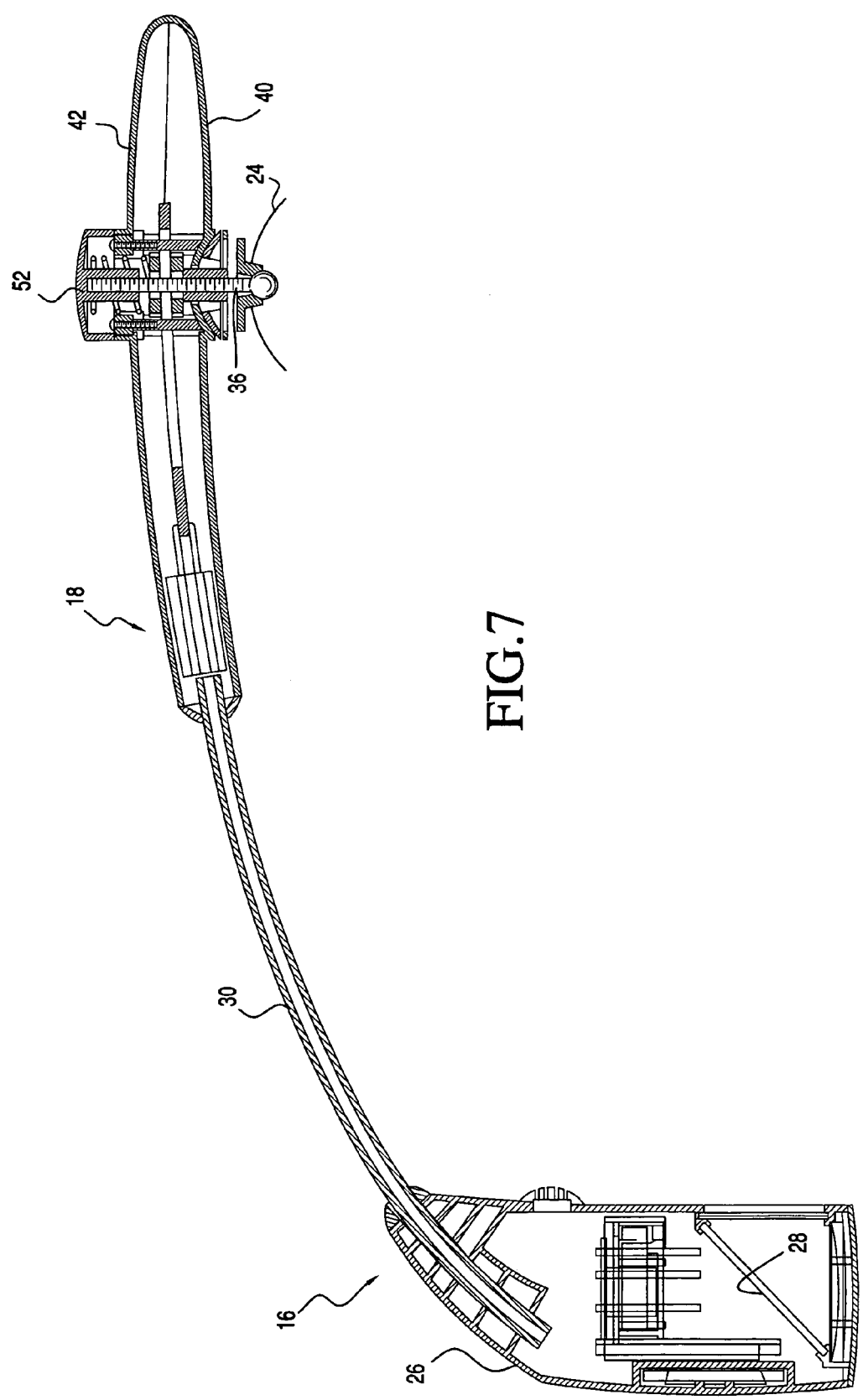

The present invention relates to headsets, and more particularly, to a headset to operably suspend a virtual display in front of an eye wherein the headset is adjustable to suit the needs of the user yet sufficiently coupled to the head to prevent excess movement of the display.

2. Description of Related Art

Current display supports have employed a helmet that includes a mounted visor. These generate discomfort if worn for extended periods of time and also are difficult to stabilize and thus they make it difficult for the user to keep the virtual display at the correct location for optimum viewing. There is a need for a personal virtual display that is smaller and more comfortable to use a current alternative and allow the viewer to see large images that are not cut-off.

There is a need for supporting a virtual display that is smaller and more comfortable then a helmet or other current alternative and easily adjustable in a controlled manner. Such a headset would allow optimized viewing of the virtual display in a non-immersive environment without causing discomfort during extended period of use. Thus users could view other items around them while watching the display and could adjust the headset depending on the user's situation and needs.

BRIEF SUMMARY OF THE INVENTION

The headset of the present invention includes a headpiece for securing a headset to the user, a display boom coupled to the headpiece for supporting a virtual display and a pivot that attaches the display boom to the headpiece allowing positional adjustment of the display around at least two degrees of freedom with respect to the headpiece.

BRIEF DESCRIPTION OF THE SEVERAL VIEWS OF THE DRAWING(S)

FIG. 1 is a perspective view of a headset.
FIG. 2 is an expanded perspective view of a display.
FIG. 3 is an expanded perspective view of a portion of the headset.
FIG. 4 is a cross-sectional view of the headset including a cantilevered arm and a pivot.
FIG. 5 is a detailed view of the pivot connection.
FIG. 6 is another embodiment of the pivot connection.
FIG. 7 is another embodiment of the cantilevered arm and the display

DETAILED DESCRIPTION OF THE INVENTION

FIG. 1 shows a virtual display headset 10. The virtual display headset includes a resilient and flexible headband 12, sometimes referred to as a headpiece, for securing the headset to a users head. The headset includes one or more headband supports 14, a virtual display 16, and a cantilevered arm 18.

FIG. 1 also shows a pivot 20 attached to the cantilevered arm 18 and the headpiece 12. The pivot 20 allows positional adjustment of the cantilevered arm 18 by the user about at least two orthogonal axes with respect to the headpiece. The pivot 20 is capable of rotating the cantilevered arm about all three orthogonal axes. Also shown in FIG. 1 is an earpiece 22 and a stabilizer 24. FIG. 2 shows an expanded perspective view of the virtual display 16 including a display housing 26 and one or more display lenses 28. It will be clear to those in the art that many different virtual displays can be used in this display headset, some of which will appear different from the one shown in FIG. 2.

FIG. 3 shows an expanded portion of the virtual display headset 10 including the cantilevered arm 18. The cantilevered arm 18 includes a flexible boom 30 attached to a boom base 32, which includes an elongated slot 34 to allow translational movement of the virtual display 16 for adjusting the distance of the virtual display 16 from the user's eye. A rod 36 passes through the elongated slot 34 and through a boom enclosure 38. The boom enclosure 38 has a first piece 40 and a second piece 42 that encloses and supports the boom base 32. The flexible boom 30 is preferably hollow to allow wires and other elements capable of transmitting information to and from the display and can be contained in the space. The boom enclosure 38 of the cantilevered arm 18 also includes a spring 44 and one or more notched washers 46. The washers shown have two notches that are capable of engaging two legs or bosses 48 of the first piece 40 of the enclosure 38. These legs 48 are designed to mate with the second piece 42 of the enclosure through opening(s) 50. A knob 52 engages the rod 36 that extends through opening 54 in the second piece 42 of the enclosure. This can be a threaded connection or other types of connection, such as a frictional connection.

The pivot 20 includes a hemispherical dome 56 capable of engaging a socket 58 on the first piece 40 of the support enclosure 38. The hemispherical dome 56 has at least three points of contact with the socket 58 so that the two surfaces form a frictional interface wherein the cantilevered arm 18 is rotationally adjustable about two orthogonal axes with respect to the user. The hemispherical dome 56 includes an elongated aperture 60. An asymmetric collar 62 fits concentrically on the rod 36 and within the elongated aperture 60. The relational shape and size of the collar 62 allows limited movement of the rod 36 within the aperture 60. The shape of the aperture and asymmetric collar 62 can determine the amount of movement and the degrees of freedom allowed. The elongated aperture is designed to allow the movement of the display in a controlled manner. The hemispherical dome 56 could take other shapes that would have different curved surfaces desirable for different circumstances.

FIG. 4 shows a cross-section of a portion of the cantilevered arm 18. Fasteners 61 deployed within the legs 48 can rigidly hold the enclosure 38 together but are not necessary. The cantilevered arm 18 and pivot 20 are assembled with the rod 36 deployed concentrically through the asymmetric collar 62, the cantilevered arm 18 including elongated opening 34 and its assembled components, and the spring 44 attached to the knob 52. The knob 52 is adjusted to apply varying compression on the spring 44. The rod 36 shown in FIG. 4 has a ball bearing type ending 64 so that it can have limited movement.

The pivot 20 in FIG. 5 includes a back plate 66. The rod 36 may be deployed from behind the back plate 66 and further through a conical opening 68 in the back plate 66. Alternatively, as shown in FIGS. 6 and 7, the ball shaped ending 64 can be in the back plate 66 or other areas of the pivot 20 or in the headpiece 12, in the stabilizer 24, or in other attachments to the headpiece. The ball bearing-type endings 64 is moveable relative to the headpiece 12 allowing gross movement of the cantilevered arm 18. The flexible boom allows fine tuned movements of the boom 30. Together, the user can achieve the adjustments desired. It is clear that the asymmetrical collar 62 alone, the cone shaped opening alone, or some combination, could be effectively used to make the controlled adjustments by acting as a limit 70 to movements and rotations described herein.

This combination of gross and fine-tuned adjustment allows for efficient and accurate alignment of the virtual display 16. The first controlled adjustment that can be made is rotation of the virtual display 16 through one hundred eighty degrees allowing the headset 10 to be positioned in front of the left or right eye of the user. This is accomplished by adjusting knob 52 to release the first piece 40 from the asymmetric collar 62 and allowing the whole cantilevered arm 18 to be rotated one hundred eighty degrees about the axis of the rod 36. It would be well known by those in the art that this rotation could be any value up to one hundred eighty degrees. For instance, a rotation of ninety degrees would allow the virtual display 16 to be positioned above the user's head. A rotation of twenty-five degrees would allow the display 16 to be positioned below or above the user's eye level. A second limit(s) 72 is used to prevent the cantilevered arm from moving more than one hundred eighty degrees.

The second possible controlled movement of display 16 can be accomplished by moving the cantilevered arm 18 inward or outward along a second orthogonal axis of rotation. This is possible because the rod 36 is located in an asymmetrical collar 62. It is possible to alternatively or in combination also limit movement with a cone-shaped opening 68 and back plate 66 to allow limited angular movement. This movement can be controlled through springs, frictional surfaces, or the limitations of the shape at the end of the rod 36 that locates in the back plate 66. By adjusting knob 52 in either a longitudinal or rotational manner such that compressional tension in spring 44 is reduced may also achieve movement of the cantilevered arm 18 about the second orthogonal axis by allowing the hemispherical dome 56 and socket 58 to move relative to each other. Control of such movement can be enhanced by the use of frictional materials or by adding projections to either surface. Projections on the socket 58 or alternatively on the hemispherical dome 56, could take many different formats including a series of regularly spaced projections that would allow the cantilevered arm to rotate a desired angle(s) placing the display at different locations in front of the user at specific, convenient retained positions. These projections or limits prevent the virtual display 16 from random movement and keep the display fixed in one position which is extremely important with the virtual-displays of the type of co-pending application of Micro-Video Display with Compact Configuration owned by the same applicant and incorporated by reference.

Limited controlled rotational movement about a third axis might be desirable. This would allow rotation about the longitudinal axis of the cantilevered arm 18 and would be effected by modifying the shape of the asymmetric collar 62 or the cone shaped opening 68. Releasing spring 44 and moving the boom base 32 in either longitudinal direction can accomplish the translational movement of the virtual display 16. The elongated slot 34 controls and limits the extent of this movement. All of these movements are extremely helpful when done in the controlled manner that this invention allows, keeping the virtual display 16 stable and conveniently positioned, allowing efficient adjustments both of a major and minor amount to satisfy the user's needs, requirements and comfort.

The invention claimed is:

1. A headset for supporting a virtual display, the headset comprising:
   a) a flexible headband with two ends, a headband support attached to one end, and a stabilizer attached to the other end;
   b) a pivot adjacent the headset, the pivot comprising:
      i) a rotator defining an elongated aperture and comprising a hemispherical dome on one side;
      ii) an asymmetric collar held in the elongated aperture; and
      iii) a back plate intermediate the rotator and the headband;
   c) a cantilevered arm connected to the pivot, the cantilevered arm comprising:
      i) a boom enclosure having a first piece comprising a socket on one side and two legs on the other side and a second piece comprising two leg openings;
      ii) a boom base defining an elongated slot intermediate the first piece and the second piece of the enclosure;
      iii) two notched washers, one on either side of the boom base, intermediate the first piece and the second piece of the enclosure;
      iv) a flexible boom arm attached to the boom base; and
      v) a knob adjacent the second piece of the enclosure with an opening; and
   d) an angularly moveable rod connecting the knob through the two notched washers, the elongated slot, and the collar to the back plate.

2. The headset of claim 1 further comprising a further translationally movable means.

3. The headset of claim 1 wherein the pivot further comprises a limit.

4. The headset of claim 3 wherein the limit further comprises an asymmetric collar capable of fitting within the hemispherical dome such that the relational shape and size of the collar allows limited movement of the rod within the slot.

5. The headset of claim 1 further comprising a rod with a ball bearing on one end.

* * * * *